United States Patent [19]

Greer et al.

[11] 4,142,316

[45] Mar. 6, 1979

[54] FISHING ROD HOLDER AND BITE INDICATOR

[76] Inventors: Edward M. Greer, 820 Loma Vista Dr., Beverly Hills, Calif.LIF 90210; Frank J. Spezzano, 3780 Briarwood, Las Vegas, Nev. 89121

[21] Appl. No.: 770,702

[22] Filed: Feb. 22, 1977

[51] Int. Cl.² ............................................. A01K 97/12
[52] U.S. Cl. .......................................... 43/17; 43/21.2
[58] Field of Search ............................. 43/17, 21.2, 16

[56] References Cited

U.S. PATENT DOCUMENTS

| | | | |
|---|---|---|---|
| 2,735,596 | 2/1956 | Smedley, et al. | 43/21.2 UX |
| 2,809,459 | 10/1957 | Banks | 43/17 |
| 2,909,860 | 10/1959 | Braun | 43/17 |
| 3,012,354 | 12/1961 | Hansen | 43/17 |
| 3,154,274 | 10/1964 | Hillcourt | 43/21.2 X |
| 3,285,360 | 11/1966 | Wetsch | 43/17 |
| 3,359,672 | 12/1967 | Schwartz et al. | 43/17 |
| 3,618,068 | 11/1971 | Sloan | 43/17 X |
| 3,645,028 | 2/1972 | Rayburn | 43/17 |
| 3,646,697 | 3/1972 | Jennings | 43/17 |
| 3,713,131 | 1/1973 | Marshall | 43/17 X |

Primary Examiner—Clifford D. Crowder
Attorney, Agent, or Firm—Keith D. Beecher

[57] ABSTRACT

A fishing rod holder is provided which may be driven into the ground, and which includes a tubular portion for receiving the handle of a fishing rod and for supporting the rod at a desired angle so that it extends out over the body of water from which fish are to be extracted. The tubular portion includes a slot at its upper end through which the reel of the fishing line extends. An electrical indicator unit, which may include a buzzer, a light, or other electrically energized indicator, is mounted on the side of the tubular portion near its upper end. The electrical indicator unit is self-contained in a separate case, and it includes the usual batteries and electrically energized indicator. The unit also includes a spring-loaded energized trigger which extends into the tubular portion of the holder through the aforesaid slot. The handle of the fishing rod normally rests against the trigger without sufficient force to cause it to energize the electric indicator. However, when a bite occurs, the handle is moved against the trigger with sufficient force to cause it to actuate the electrical indicator unit.

5 Claims, 5 Drawing Figures

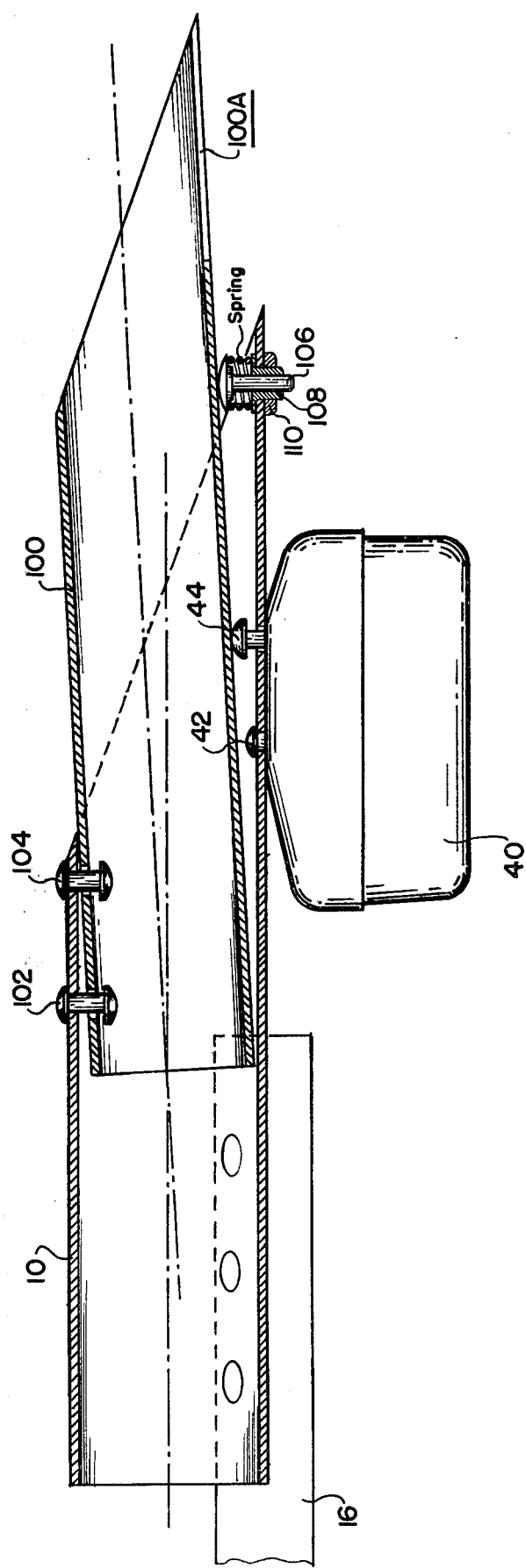

FISHING ROD HOLDER AND BITE INDICATOR

BACKGROUND OF THE INVENTION

Prior art attachments for fishing rods for causing an indication to occur when a fish bites have generally been of two types. In one type the fishing line extends across a movable switch-controlling element, and the tightening of the line when a bite occurs produces sufficient pressure on the element to actuate the switch. However, this type of prior art device is relatively complicated and expensive because of the mechanism which is necessary to accomplish its purpose.

A second type of prior art device has been one in which the fishing line passes under a pressure element between the reel and forward end of the rod. In the latter device, a bite makes the line taut enough to pull it out from under the pressure element so that it ceases to hold electric contacts within the pressure element apart, and the contacts come together and complete an electric circuit. However, the second type of prior art device is also usually unduly expensive.

The principal object of the present invention is to provide a simple and inexpensive indicator that may readily be mounted on a fishing rod holder, so as to accomplish its desired purpose. This objective is achieved in the embodiment of the invention to be described herein by mounting a self-contained electrically energized buzzer unit on the side of the fishing pole holder with its trigger extending into the interior of the holder to be engaged by the fishing pole handle received in the holder. The fishing rod handle normally rests against the trigger with insufficient force to cause it to be actuated. However, when a bite occurs, the handle is drawn against the trigger and causes it to operate the electric buzzer.

BRIEF DESCRIPTION OF THE DRAWINGS

FIG. 5 is a side elevation of a second embodiment of the invention.

DETAILED DESCRIPTION OF THE ILLUSTRATED EMBODIMENT

Figure 1:
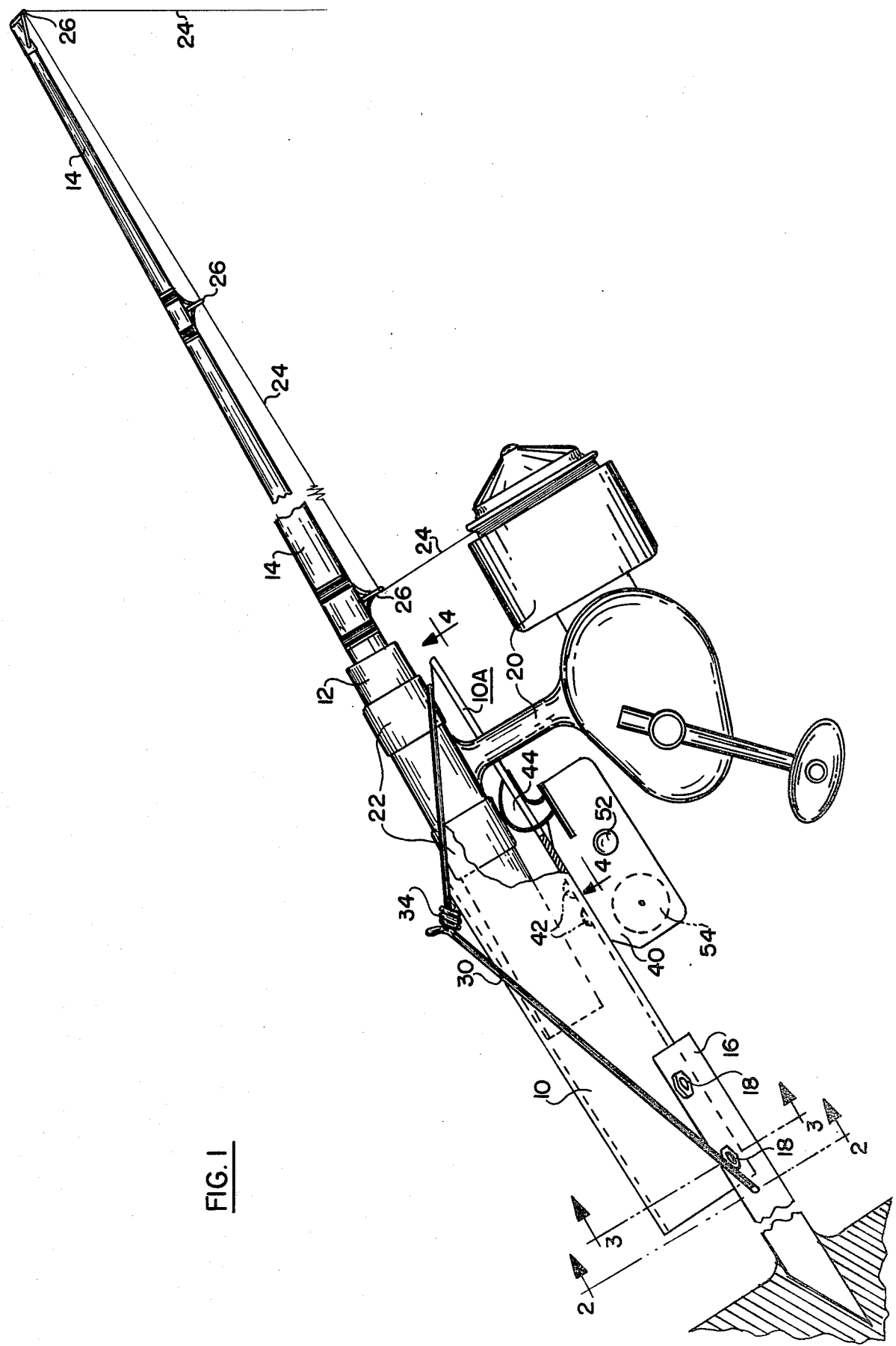
FIG. 1 is a side elevation of one embodiment of the invention.
Figure 3:
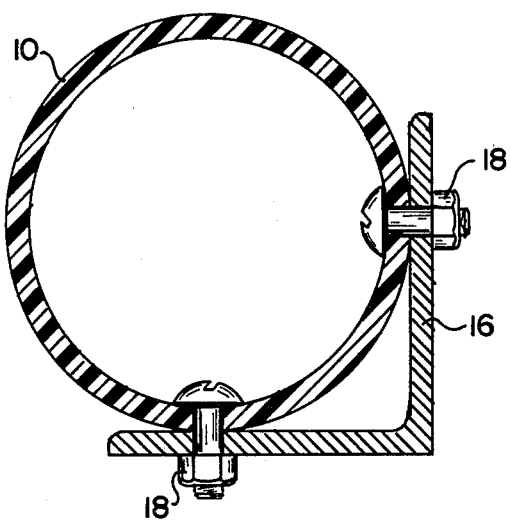
FIG. 3 is a cross-section taken along the line 3—3 of FIG. 1.

The assembly of the present invention includes a tubular holder 10 which has an open top so that it may receive the handle 12 of a fishing rod 14. The tubular holder 10 is held in the ground by an anchor spear 16 which is mounted to the lower end of rod 10 by screws or rivets 18.

The tubular holder 10 has a slot 10A adjacent to its upper end on the lower side thereof, and the fishing line reel 20 extends through the slot. The reel 20 is attached to the handle 12 of the fishing rod by appropriate mounting bands 22. A fishing line 24 extends from the reel 20 through loops 26 along the rod 14.

Figure 2:
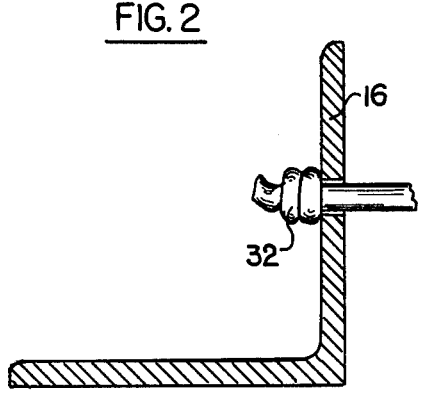
FIG. 2 is a cross-section taken along the line 2—2 of FIG. 1.
Figure 4:
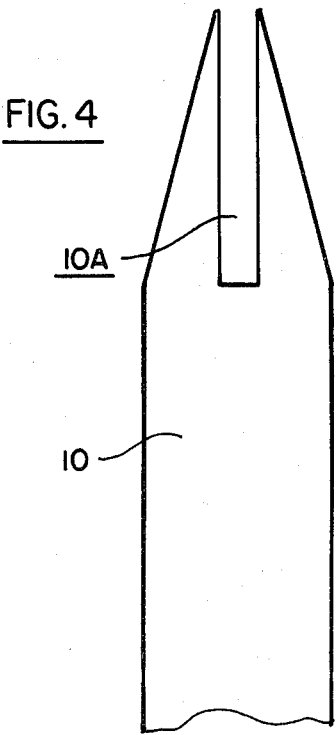
FIG. 4 is a detailed view taken essentially along the line 4—4 of FIG. 1.

As illustrated, the upper end of the tubular holder 10 is cut at a bias, and an anchor line 30 is looped around the handle 12 of the fishing rod at the upper end of the tubular portion, the line extending to the anchor spear 16, and though a hole in the anchor spear, at which it is knotted, as shown at 32 in FIG. 2. The loop at the upper end of the anchor line is supported by a slip knot 34, and the line is tightened to prevent the fishing rod from being pulled out of the tubular holder.

The case 40 of a self-contained electrically energized buzzer, or other electrical unit, is mounted to the underside of the tubular support member 10 by rivets or other mounts 42, adjacent to the slot 10A. The electrical unit includes a trigger 44 which extends into the interior of the tubular holder 10 to be engaged by the fishing rod handle 12.

The trigger 44 is spring-loaded, and under normal circumstances the handle 12 does not have sufficient force to actuate the trigger. However, when a bite occurs, the handle is moved against the trigger and causes it to energize the electrical buzzer unit, so that the buzzer sounds.

Casing 40 may be provided with a release button 52 to permit the case to be opened, so that batteries, such as battery 54 mounted in the case may be replaced, when required.

In the embodiment of FIG. 5, a tubular holder 100 is supported within the end of the outer tubular holder 10 by a pair of rivets 102, 104; and the inner tubular holder bears against the trigger 44. The inner tubular holder 100 is biased to the illustrated cocked position by a spring-loaded piston 106. The spring force may be adjusted by an adjusting screw 108 which is threaded into an adjusting nut 110.

The inner tubular holder is provided with a slot 100A adjacent to its upper end on the lower side thereof to receive the reel 20 of the fishing rod 14 of FIG. 1. The fishing rod may be held within the inner tubular holder 100 by the anchor line 30 and slip knot 34 of FIG. 1.

In the second embodiment, the inner tubular holder 100, rather than the fishing rod itself, engages the trigger 45 to activate the electrical unit within case 40, when a bite occurs.

The invention provides, therefore, a simple and inexpensive indicator unit for a fishing rod which is mounted on a rod holder, and which provides an indication whenever a bite occurs.

It will be appreciated that although particular embodiments of the invention have been shown and described, modifications may be made. It is intended in the claims to cover the modifications which come within the spirit and scope of the invention.

What is claimed is:

1. A fishing rod holder and bite indicator including: a single tubular member for receiving the handle of a fishing rod, said tubular member having a slot adjacent to the upper end thereof; an electrical indicator unit mounted on the external surface of said tubular member adjacent to said slot; and a spring loaded trigger protruding from said indicator unit extending through said slot to be engaged by the handle of the fishing rod so as to be actuated by angular movement of the handle of the fishing rod when a bite occurs to energize said indicator unit, and the reel of the fishing rod also extending through said slot.

2. The fishing rod holder defined in claim 1, and which includes an anchor spear attached to the lower end of said tubular means for supporting said tubular means at a desired angle.

3. The fishing rod holder defined in claim 2, and which includes an anchor line looped around the fishing rod handle at the upper end of said tubular means and attached to said anchor spear for retaining the fishing rod in the tubular means.

4. The fishing rod holder defined in claim 1, in which said tubular means comprises inner and outer telescopically mounted tubular members, and which includes spring-loaded piston means for cocking said inner tubular member with respect to said outer tubular member.

5. The fishing rod holder defined in claim 4, in which said trigger extends through the outer tubular member to engage the outer surface of the inner tubular member.

* * * * *